June 15, 1965 L. B. SCOTT 3,189,892

ANALOG-TO-DIGITAL CONVERTER

Filed Nov. 8, 1961 3 Sheets-Sheet 1

INVENTOR.
Larkin B. Scott
BY [signature]
ATTORNEY.

June 15, 1965 L. B. SCOTT 3,189,892

ANALOG-TO-DIGITAL CONVERTER

Filed Nov. 8, 1961 3 Sheets-Sheet 2

INVENTOR.
Larkin B. Scott
BY E.R. Hyde Jr.
ATTORNEY.

June 15, 1965 L. B. SCOTT 3,189,892

ANALOG-TO-DIGITAL CONVERTER

Filed Nov. 8, 1961 3 Sheets-Sheet 3

INVENTOR.
Larkin B. Scott

BY E R Hyde Jr.

ATTORNEY.

United States Patent Office 3,189,892
Patented June 15, 1965

3,189,892
ANALOG-TO-DIGITAL CONVERTER
Larkin B. Scott, Fort Worth, Tex., assignor to The Perkin-Elmer Corporation, Norwalk, Conn., a corporation of New York
Filed Nov. 8, 1961, Ser. No. 150,996
14 Claims. (Cl. 340—347)

Figure 1:
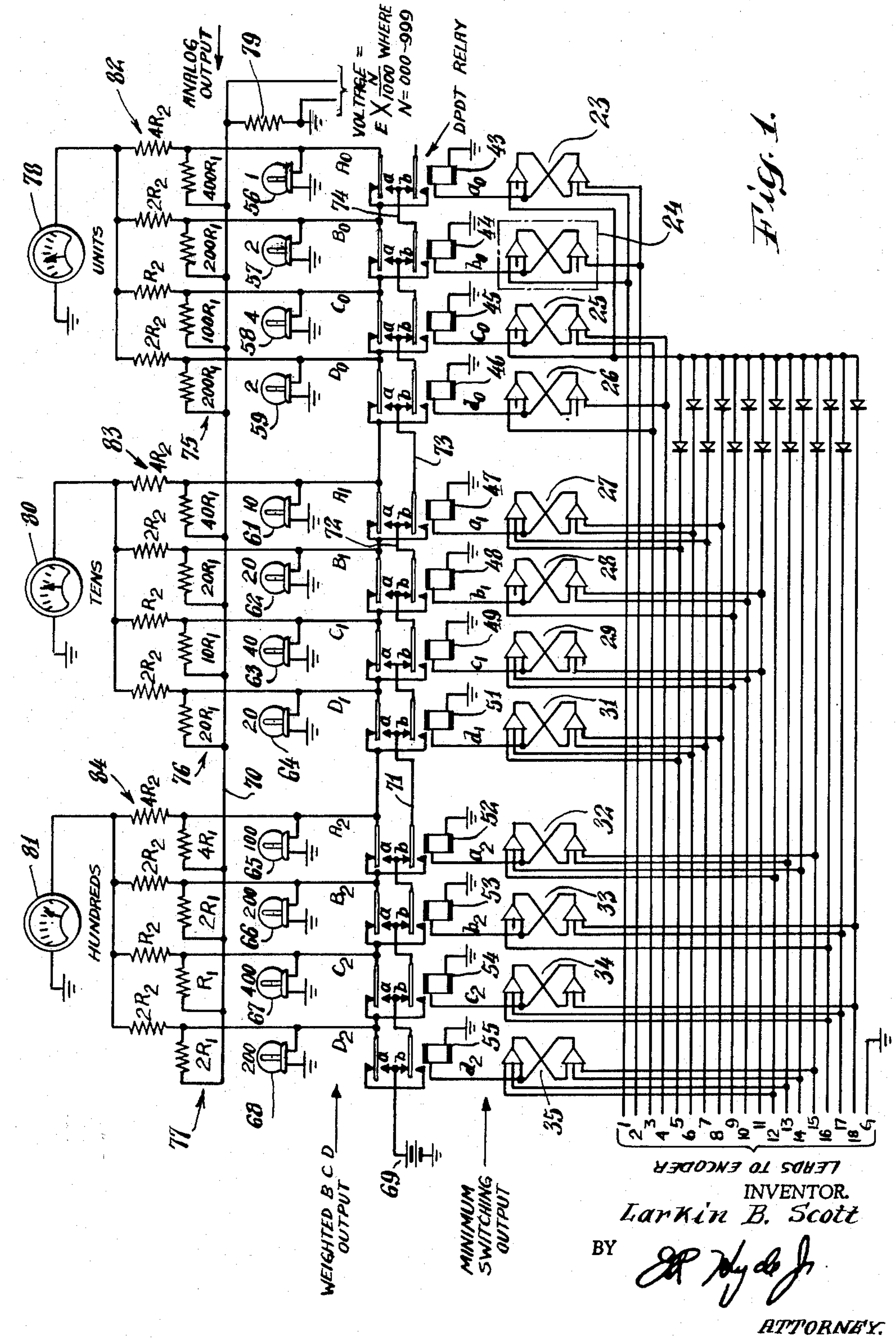

The present invention relates in general to analog-to-digital converters and more particularly to an encoder wherein the position of a mechanical input may be represented in digital form.

Some of the encoders on the market today employ a code disc made by printed circuit techniques which is rotated by an input shaft. The conducting segments of the code disc make contact with electrical wipers or brushes in some sequence that either directly or indirectly establishes the desired code signals at the output leads. Where the desired output is a conventional binary number proportional to shaft angle, the difficulty is encountered that adjacent numbers often differ in several of the digits, so that in changing from one of these numbers to the other, all output changes must occur simultaneously else an ambiguous number is temporarily created.

One method of avoiding this problem is to use a type of code shown in U.S. Patent No. 2,632,058 of F. Gray. This code possesses the property that adjacent numbers differ in only one digit and thus there is no problem of simultaneous contact changes. This code has become known in the art as the Gray code or reflected binary.

Another method of avoiding the ambiguity problem for encoders that generate conventional binary is one which employs leading and lagging brushes. The principle of this technique is to arrange matters so that the state of the least significant output controls whether the leading or lagging brush of the next least significant output is used, and so on. Thus the output changes which take place in passing from one number to the next is controlled entirely by the least significant (and most often changing) output, and all occur simultaneously. This has an advanatge over the reflected binary encoder technique in that the positional accuracy of the conducting segments of the code disc is lessened for the more significant digit outputs.

In many instances the desired output for the encoder is some form of binary coded decimal (BCD). For these situations, ten of the sixteen binary numbers from 0000 to 1111 are selected on some basis to represent the ten decimal numerals 0 thru 9. Two such selections that are in use are shown below.

| | | |
|---|---|---|
| 0 | 0000 | 1000 |
| 1 | 0001 | 1100 |
| 2 | 0010 | 0100 |
| 3 | 0011 | 0110 |
| 4 | 0100 | 0010 |
| 5 | 0101 | 0011 |
| 6 | 0110 | 0111 |
| 7 | 0111 | 0101 |
| 8 | 1000 | 1101 |
| 9 | 1001 | 1001 |

The first of these is referred to as the 8421 code and may be recognized as simply the first ten combinations comprising the first ten conventional binary numbers. The second of these is a code having the property of being minimum switching as with the Gray code, and for its property of forming the nine's complement of the numeral represented by inverting (changing the state of) the least significant digit. This latter feature is useful in the conversion scheme employed to convert from the code to other numeral representations.

The 8421 code derives its name from the fact that the most significant digit possesses the "weight" 8, the next a weight of 4, and so on where the numeral represented is equal to the sum of the weights. This property in a code is useful for easy conversion to analog quantities, and eases interpretation of the code by humans since it is only necessary to memorize the weights of the code and not the code itself. However no minimum switching code such as the second code above can be at the same time a weighted code.

Any of the encoder types referred to in general terms above suffer the disadvantage of requiring a relatively large number of wiping contacts or brushes. In order to avoid a spurious output (wrong number), all contacts must function properly and not become "noisy" (variable high contact resistance) with prolonged use. To combat this problem, the contact force against the code disc must exceed some minimum, and the drag created by the combined forces of many brushes has, in some cases, caused the operating torque for the device to be objectionably high. If high contact force is not resorted to, then with advanced usage under poor environmental conditions the chances are enhanced for unsure contact which leads to an erratic output signal.

In some types of encoders, the code disc is composed of material whose optical or magnetic properties substitute for the conducting properties of the code discs thus far referred to. These devices can operate with substantially lower torque due to the velocity of rotation since the optical or magnetic pick-offs do not ordinarily require physical touching or drag upon the code disc. Nevertheless, it is still necessary that the code disc itself be rotated by the input shaft, and the inertia of the disc itself creates an opposing torque under acceleration. Thus in certain applications where the encoder must be driven in rotation by a delicate instrument or servomechanism, the latter could conceivably be affected adversely by the inertia of the encoder.

Accordingly an object of the present invention is to provide an improved shaft encoder.

A more specific object of the present invention is to provide an improved encoder employing only a single brush or wiper to minimize the drag and inertia torque on the input shaft.

Another object of the present invention is to provide a shaft encoder wherein the output signal is independent of wiper contact noise or high output contact resistance that might develop with advanced usage.

A further advantage is to provide an improved shaft encoder having the advantages of a minimum switching or reflected binary code and providing a weighted binary decimal code output.

A still further object of the present invention is to provide an improved shaft encoder of simple construction and certain in operation.

A more specific object of the present invention is to provide an improved, self-indexing, incremental encoder.

The more conventional types of encoder which employ a code disc and multiple brushes will, in normal operation, give a complete code output for any setting of the input shaft without any dependence on the past rotational history of the input. This provision is functionally wasteful, for it requires the encoder to generate at all input settings the total output information or code value associated with any setting; and yet, in passing from one input setting to the next, there is often little change in the code values needed to describe the new output information. This is particularly true where encoders take advantage of Gray or minimum-switching codes which change only one binary digit at a time. This requirement to generate all the code, all the time, is the cause for many brushes in the encoder.

The encoder of the present invention takes advantage of the condition, that is some form of memory is introduced to store the output information, the encoder function itself can be simplified to that of generating only the changes in the output information. The stability of the output code values then becomes dependent on characteristics of the storage devices and not of continuous and uninterrupted contact closure within the encoder.

An encoder using the principle just described falls in a class with the incremental encoders, but a novel feature of the method employed in the present device is that it overcomes the "loss of count" defect of the past incremental types. When power is applied to the circuit following a temporary interruption or a period of dis-use, the correct output data obtains as soon as the input shaft travels an amount of no more than one percent of the full scale rotation. This occurs for a displacement in either direction from any starting point throughout the entire range of rotation. Since the output values encountered in applications would not be constrained to a range spanning less than one percent of full scale, the device readily re-indexes itself after any loss or incorrect storage of data.

Since the encoder need only generate information regarding changes in the code values, and since a prudent choice of code can minimize such changes, it should follow that the information content of the encoder output could be less than that of static code generators and, hence, be more conservative of information space required of any means employed to transport the encoder data to its associated circuitry. To cite an example which will be explained in more detail hereinafter a model, which exhibits a total range of 1000 counts in binary coded decimal (3 decimal digits) could be arranged to send its shaft angle information from a remote location making use of but six binary signal circuits or channels. By contrast, the output from a static code generator would require twelve channels for the same total count capacity. Since the self-indexing feature is preserved in this mode of operation, this conservation of channel space could be extremely important in telemetering applications in which the use of static code generators had otherwise been contemplated because of other requirements.

To look at the benefits from this mode of operation in another way, the six binary signal channels which suffice to transmit data of the present device providing remote angle measurement to one part in a thousand would, if used in the more ordinary way to express the output values from a static code generator, provide a maximum resolution of but one part in sixty four. Thus, an increase in resolution of approximately sixteen times is possible by this improved technique.

For reasons already stated, the new encoder principle hereindescribed derives great benefit from the existence of useful, minimum-switching codes of which the Gray code is an example. Since codes of this type need only be changed by the value of a single binary digit to pass from one number to the next adjacent (higher or lower), an encoder based on the principle of generating only the change information about the code is privileged by their use in that it need issue fewer instructions. Many such codes are possible, but the supply is limited to some extent by the desire to have the encoder compatible with a binary coded decimal system of number representation which is advantageous particularly in the industrial use of encoders where human inspection and interpretation of things in progress is more apt to occur. Hence, at the outset, the choice of code is narrowed to one that is minimum switching and relatable by some practical transformation to some useful decimal code. For the decimal code to have the most useful properties from the standpoint of human interpretation, and especially for ease of conversion to analog quantities and for making possible the use of less expensive read-out devices (all to be illustrated later on), it should be a weighted code. Thus the basic selection rules are: (1) Minimum Switching Code—for ease of commanding changes, (2) Binary Coded Decimal Form—for ease of reading by humans, and (3) Convertible to Weighted Binary Coded Decimal—for easier interpretation by humans and for conversion to other forms of number representation.

It is interesting to discover that if these rules are applied in the order given, and if rule (3) be exercised by the simplest possible conversion method, then the choice narrows to two possible codes. This will be demonstrated in the following.

First, rules (1) and (2) bring about the result that the four binary bits representing the least significant (units) decimal digit must always have their states interpreted to mean either the true decimal numeral or its nine's complement (true numeral subtracted from "9") depending on the evenness of the number of binary 1's in the code representations for all of the higher order decimal digits. For instance, assume momentarily that the code number for the decimal numeral "0" is 0000 or any other combination containing an even number of binary 1's. Then the least significant decimal digit will be read true when the number of binary 1's in code numbers for higher decimal digits is even, and will be read as the nine's complement when the number of binary 1's is odd.

Thus any minimum switching code in the notation of binary coded decimal presents an inherent ambiguity that can only be resolved by an even-odd determination, or the equivalent, with respect to the higher order digits. This is true if any use whatever is made of the code, either by humans or machines.

On approaching application of code selection rule (3), it must at once be recognized that a minimum switching code cannot of itself be weighted according to the definition of weighted codes. A code that may be weighted in the desired sense, is one for which it is possible to assign a fixed weight or value to each digit of the code word when the digit is "1," and to observe for any code word that the true number represented is the sum of these weights. In a minimum switching code there are obvious instances necessary where to change to the next higher true number involves changing some "1" in the code word to a "0." Since this would be the only change, the new sum of weights would be less than the original sum which contradicts the concept of a weighted code. Thus, to derive the benefits of both a minimum switching and a weighted code, companion codes are a mandatory requirement, and a conversion rule, or algorithm, must be recognized for converting one to the other. This situation exists whether the notation is binary decimal, or straight binary.

Although a number of code possibilities are possible with the encoder of the present invention, the specific embodiment herein disclosed conveniently employs the following:

TABLE 1

| Decimal number | 2421 binary coded decimal number | Minimum switching (Gray) companion code |
|---|---|---|
| 000 | 0000 0000 0000 | 0000 0000 0000 |
| 001 | 0000 0000 0001 | 0000 0000 0001 |
| 002 | 0000 0000 0010 | 0000 0000 0011 |
| 003 | 0000 0000 0011 | 0000 0000 0010 |
| 004 | 0000 0000 0100 | 0000 0000 0110 |
| 005 | 0000 0000 1011 | 0000 0000 1110 |
| 006 | 0000 0000 1100 | 0000 0000 1010 |
| 007 | 0000 0000 1101 | 0000 0000 1011 |
| 008 | 0000 0000 1110 | 0000 0000 1001 |
| 009 | 0000 0000 1111 | 0000 0000 1000 |
| 010 | 0000 0001 0000 | 0000 0001 1000 |
| 011 | 0000 0001 0001 | 0000 0001 1001 |
| 012 | 0000 0001 0010 | 0000 0001 1011 |
| 013 | 0000 0001 0011 | 0000 0001 1010 |
| 014 | 0000 0001 0100 | 0000 0001 1110 |
| 015 | 0000 0001 1011 | 0000 0001 0110 |
| 016 | 0000 0001 1100 | 0000 0001 0010 |
| 017 | 0000 0001 1101 | 0000 0001 0011 |
| 018 | 0000 0001 1110 | 0000 0001 0001 |
| 019 | 0000 0001 1111 | 0000 0001 0000 |
| 020 | 0000 0010 0000 | 0000 0011 0000 |
| 021 | 0000 0010 0001 | 0000 0011 0001 |
| 022 | 0000 0010 0010 | 0000 0011 0011 |
| 023 | 0000 0010 0011 | 0000 0011 0010 |
| etc. | etc. | etc. |
| 997 | 1111 1111 1101 | 1000 0000 0011 |
| 998 | 1111 1111 1110 | 1000 0000 0001 |
| 999 | 1111 1111 1111 | 1000 0000 0000 |
| 000 | 0000 0000 0000 | 0000 0000 0000 |

Figure 2:
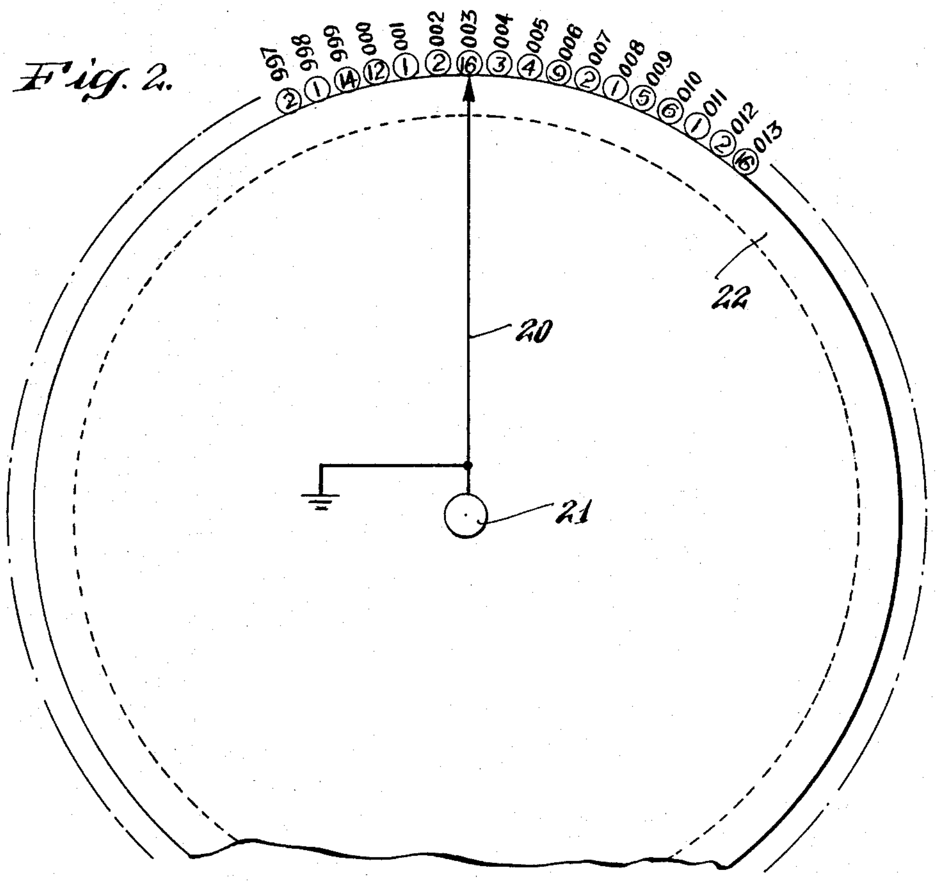
Figure 3:
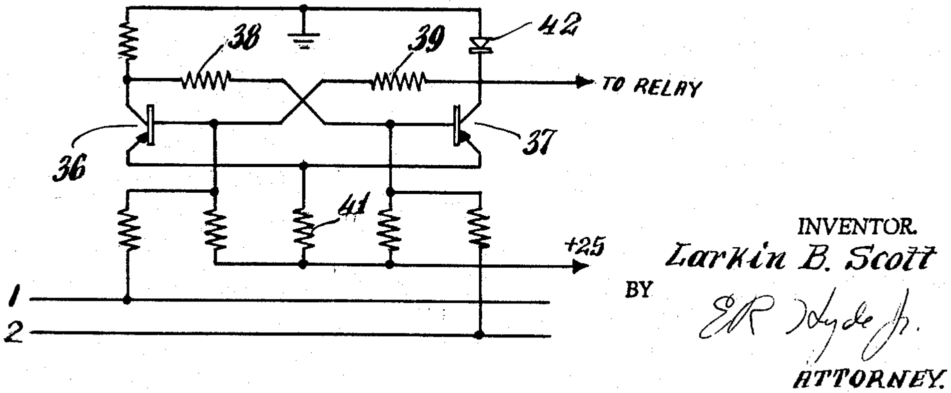
Figure 4:
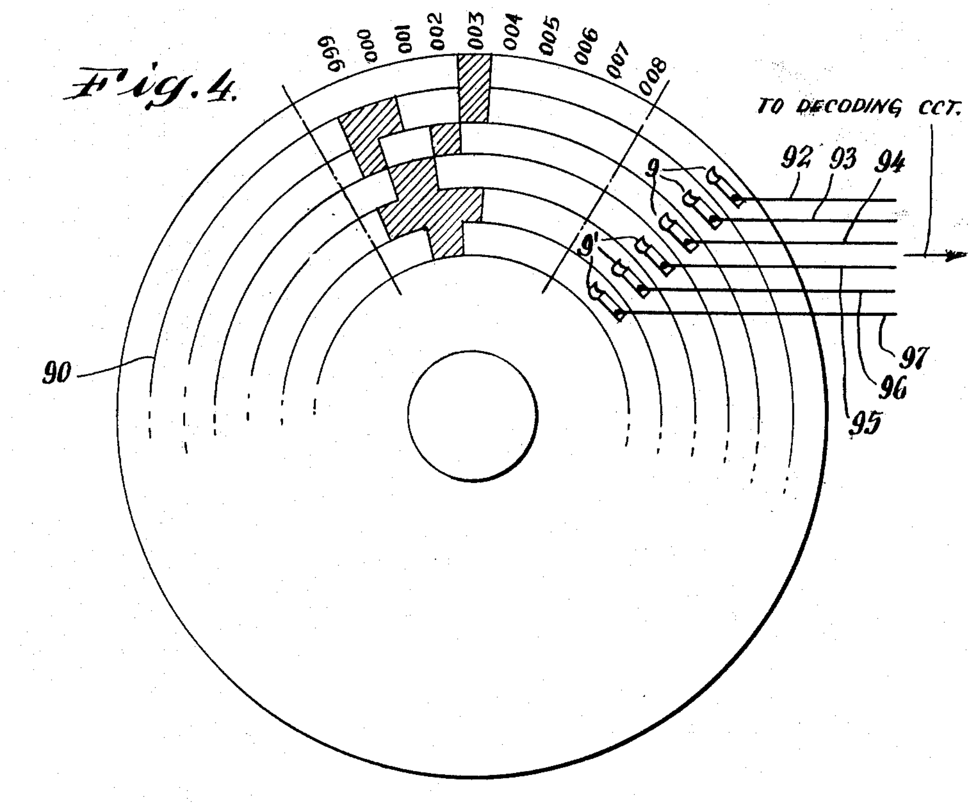
Figure 5:
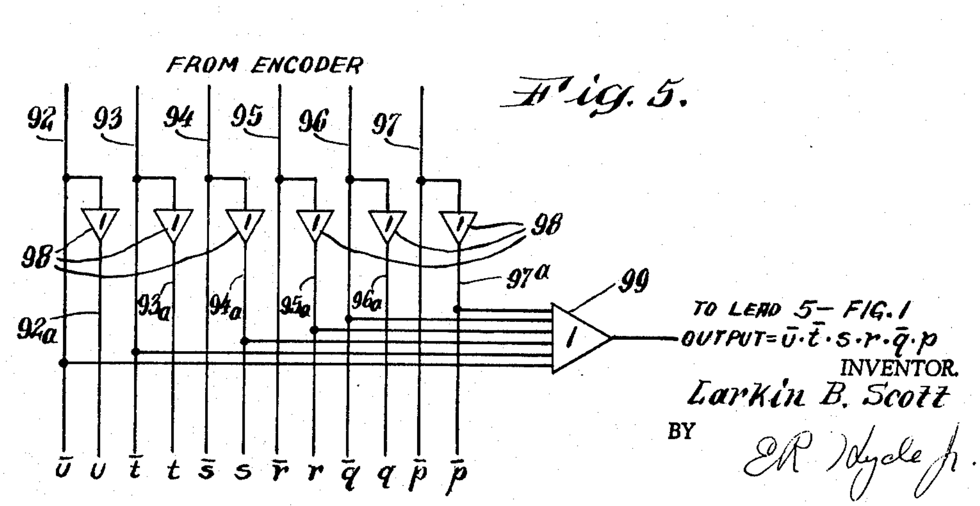

The invention will be more fully understood by the following description of a preferred embodiment thereof considered with the drawings in which:

FIG. 1 is a schematic diagram of the converter circuit of the particular embodiment of the invention herein described, FIG. 2 is a diagrammatic illustration of a portion of the encoder switching unit showing a portion of the winding sequence, FIG. 3 is a schematic detail of a bistable storage unit employed in the converter of FIG. 1, FIG. 4 is a diagrammatic illustration of a portion of a code disc of a modification of the present invention, and FIG. 5 is a block diagram of a circuit employed with the embodiment of FIG. 4.

Structurally, the encoder of the present invention may be considered as made up of a switching or transmitting unit and a translating unit. The switching unit may take the form of a toroidal mandrel upon which a plurality of wire leads are wound in a predetermined sequence. A movable contact or wiper is secured to the input shaft and engages the wire turns to successively apply electrical pulses thereto in accordance with the shaft position. These pulses are transmitted to the translating unit where they control a number of bistable devices or flip-flops.

Before considering the circuitry of the translating unit, the switching sequence or order of position of the lead wires around the mandrel will be described.

It is understood that the lead wire turns on the mandrel serve as contacts for the wiper and the number of turns equal the counts or increments in the field range of the encoder which in the embodiment herein disclosed is one thousand. The encoder must function in either direction of rotation and thus the wire lead contacted by the wiper for a given count must control at least two flip-flop inputs so that the correct code change is accomplished independent of the direction approached. That the two change commands so required for every switch position are never the same is a consequence of the minimum switching principle.

To illustrate the above statements requires reference to the code which is given in Table 1. Letting the digits of the Gray code units column be designated $a0$, $b0$, $c0$, and $d0$ in ascending significance, $a1$, $b1$, etc. in the tens column, and $a2$, $b2$, etc. in the hundreds column, the change commands may be written as explained by the following examples.

| Change | Meaning |
|---|---|
| $a0$ $b0$ | "ON" the $a$ and $b$ flip-flop of the units digit (as at number 002). |
| $\overline{a0}$ $d2$ | "OFF" the $a$ flip-flop of the units digit and "ON" the $d$ flip-flop of the hundreds digit (as at number 999). |

The superposed bar is used to designate the off or zero state of a symbol whereas written without the bar the symbol designates the on or one state. Normally only one or the other of the two change commands will take effect, for one of the flip-flops will already be in the state called for, which one depending on the direction from which the count is approached.

The change commands for the first ten numbers are written below and may be verified by reference to the associated Gray code numbers by noting the adjacent numbers.

| Decimal number | Change command |
|---|---|
| 000 | $\overline{a0}$ $\overline{d2}$ |
| 001 | $a0$ $\overline{b0}$ |
| 002 | $a0$ $b0$ |
| 003 | $\overline{a0}$ $\overline{c0}$ |
| 004 | $c0$ $\overline{d0}$ |
| 005 | $c0$ $d0$ |
| 006 | $\overline{a0}$ $\overline{c0}$ |
| 007 | $a0$ $b0$ |
| 008 | $a0$ $\overline{b0}$ |
| 009 | $\overline{a0}$ $\overline{a1}$ |

It is noted that for any number ending in 1 thru 8 both changes affect flip-flops of the units digit, whereas for any number ending in 0 or 9, one of the changes will be in the units digit and the other in one of the higher order digits. Further, it would be permissible to expand the change commands at 000 and 009 to:

| | |
|---|---|
| 000 | $\overline{a0}$ $\overline{c0}$ $\overline{d2}$ |
| 009 | $\overline{a0}$ $\overline{c0}$ $\overline{a1}$ |

since the additional command to the $c$ flip-flop of the units digit does no harm for it is already (normally) in the state called for. Applying this technique brings about the situation that the same command is called for in the units digit for any number ending in 0, 3, 6, or 9 which is four times within any ten counts. Notice also that it would have been permissible to use the expanded change for 000 also at 003, and that for 009 at 006. Doing this would give:

| | |
|---|---|
| 000 | $\overline{a0}$ $\overline{c0}$ $\overline{d2}$ |
| 001 | $a0$ $\overline{b0}$ |
| 002 | $a0$ $b0$ |
| 003 | $\overline{a0}$ $\overline{c0}$ $\overline{d2}$ |
| 004 | $c0$ $\overline{d0}$ |
| 005 | $c0$ $d0$ |
| 006 | $\overline{a0}$ $\overline{c0}$ $\overline{a1}$ |
| 007 | $a0$ $b0$ |
| 008 | $a0$ $\overline{b0}$ |
| 009 | $\overline{a0}$ $\overline{c0}$ $\overline{a1}$ |

Thus the change command for numbers ending in 0, 3, 6, or 9 may be always associated with the higher order digits, but arranging the circuit such that any higher order command always puts into effect the $\bar{a}0\ \bar{c}0$ command required in the units digit. Furthermore, if the higher order commands could be expanded to include two commands each, and in the appropriate combinations, then the possibility presents itself of being able to completely specify the states of all twelve flip-flops by moving through any ten counts.

The commands actually required for the tens digit flip-flops during the first one hundred counts occur as follows:

| | | | |
|---|---|---|---|
| 009 | $\bar{a}1$ | 010 | $a1$ |
| 019 | $\bar{b}1$ | 020 | $b1$ |
| 029 | $a1$ | 030 | $\bar{a}1$ |
| 039 | $\bar{c}1$ | 040 | $c1$ |
| 049 | $\bar{d}1$ | 050 | $d1$ |
| 059 | $c1$ | 060 | $\bar{c}1$ |
| 069 | $\bar{a}1$ | 070 | $a1$ |
| 079 | $b1$ | 080 | $\bar{b}1$ |
| 089 | $a1$ | 090 | $\bar{a}1$ |

Numbers ending in 99 or 00 require change commands affecting the hundreds digit flip-flops, hence the above list is complete for the tens digit for counts from zero through ninety-nine. The sequence occurs in reverse order for odd hundreds digits and as given for even hundreds digits.

Notice that the tens digit flip-flops are affected in the sequence:

*a–b–a–c–d–c–a–b–a* which alternates between a member of the pair *ad* and the pair *bc*. If the change commands be combined this way, then in any decade of counts commands affecting all four tens digit flip-flops will occur. The revised tens digit commands would then be:

| | | | |
|---|---|---|---|
| 009 | $\bar{a}1\ \bar{d}1$ | 010 | $a1\ \bar{d}1$ |
| 019 | $\bar{b}1\ \bar{c}1$ | 020 | $c1\ \bar{c}1$ |
| 029 | $a1\ \bar{d}1$ | 030 | $\bar{a}1\ \bar{d}1$ |
| 039 | $b1\ \bar{c}1$ | 040 | $b1\ c1$ |
| 049 | $\bar{a}1\ \bar{d}1$ | 050 | $\bar{a}1\ d1$ |
| 059 | $b1\ c1$ | 060 | $b1\ \bar{c}1$ |
| 069 | $\bar{a}1\ d1$ | 070 | $a1\ d1$ |
| 079 | $b1\ \bar{c}1$ | 080 | $\bar{b}1\ \bar{c}1$ |
| 089 | $a1\ d1$ | 090 | $\bar{a}1\ d1$ |

A consequence of this technique is that the list of dual commands just stated possesses only seven different combinations, whereas the previous list consisted of eight distinct single commands. This results from the fact that the code never contains the combination $\bar{b}c$ and reduces by one the number of different channels or circuits required to manipulate the tens digit flip-flops.

While the number positions given above are taken up by the tens digit commands, there remain two other positions per decade at numbers ending in 3 or 6 which are available to insert hundreds digit commands. By using the same command combinations given above, two dual commands are sufficient to express the desired states of the hundreds digit flip-flops thus making it possible to set all twelve flip-flops by the commands encountered in any decade of counts. This gives the encoder its unique self-indexing characteristics which is a particularly novel feature of the present invention.

The complete list of commands are now given and will henceforth be identified by Lead No. since each command appears on a separate output circuit of the encoder. The 0th lead does not exist except in the converter equipment containing the flip-flops. As will be illustrated later on, this command is generated by the presence of a command on any lead 5 thru 18 using diodes functioning as a fourteen input OR gate.

TABLE 2

| Units digit | | Tens digit | | Hundreds digit | |
|---|---|---|---|---|---|
| Lead No. | Command | Lead No. | Command | Lead No. | Command |
| 0 | $\bar{a}0\ \bar{c}0$ | 5 | $\bar{a}1\ \bar{d}1$ | 12 | $\bar{a}2\ \bar{d}2$ |
| 1 | $a0\ \bar{b}0$ | 6 | $a1\ \bar{d}1$ | 13 | $a2\ \bar{d}2$ |
| 2 | $a0\ b0$ | 7 | $\bar{a}1\ d1$ | 14 | $\bar{a}2\ d2$ |
| 3 | $c0\ \bar{d}0$ | 8 | $a1\ d1$ | 15 | $a2\ d2$ |
| 4 | $c0\ d0$ | 9 | $\bar{b}1\ \bar{c}1$ | 16 | $\bar{b}2\ \bar{c}2$ |
| | | 10 | $b1\ \bar{c}1$ | 17 | $b2\ \bar{c}2$ |
| | | 11 | $b1\ c1$ | 18 | $b2\ c2$ |

The above eighteen leads are wound on the mandrel to provide a total of one thousands turns for the one thousand counts or command positions of the encoder. The sequence in which the contact lead wires are wound is obtained by reference to the Gray companion code set forth in Table 1 and the above Lead No. — Command Table. For example, at position 000, the commands $\bar{a}0\ \bar{d}2$ are required depending upon which direction the position is approached. The Lead No. 12 is chosen for this position since it provides the $\bar{d}2$ command and as noted above all tens and hundreds leads provide the $\bar{a}0$ command as well as $\bar{c}0$. Of course, the $\bar{c}0$ and $\bar{a}2$ commands on lead 12 do no harm since these conditions already exist. Similarly the remaining winding sequence may be calculated and is as follows:

WINDING SEQUENCE

| Decade No. | 0 | 1 | 2 | 3 | 4 | 5 | 6 | 7 | 8 | 9 |
|---|---|---|---|---|---|---|---|---|---|---|
| 0 | $\underline{\underline{12}}$ | 1 | 2 | $\underline{\underline{16}}$ | 3 | 4 | $\underline{9}$ | 2 | 1 | $\underline{5}$ |
| 1 | $\underline{6}$ | 1 | 2 | $\underline{\underline{16}}$ | 4 | 3 | $\underline{\underline{12}}$ | 2 | 1 | $\underline{9}$ |
| 2 | $\underline{10}$ | 1 | 2 | $\underline{\underline{16}}$ | 3 | 4 | $\underline{\underline{12}}$ | 2 | 1 | $\underline{6}$ |
| 3 | $\underline{5}$ | 1 | 2 | $\underline{\underline{16}}$ | 4 | 3 | $\underline{\underline{12}}$ | 2 | 1 | $\underline{10}$ |
| 4 | $\underline{11}$ | 1 | 2 | $\underline{\underline{16}}$ | 3 | 4 | $\underline{\underline{12}}$ | 2 | 1 | $\underline{5}$ |
| 5 | $\underline{7}$ | 1 | 2 | $\underline{\underline{16}}$ | 4 | 3 | $\underline{\underline{12}}$ | 2 | 1 | $\underline{11}$ |
| 6 | $\underline{10}$ | 1 | 2 | $\underline{\underline{16}}$ | 3 | 4 | $\underline{\underline{12}}$ | 2 | 1 | $\underline{7}$ |
| 7 | $\underline{8}$ | 1 | 2 | $\underline{\underline{16}}$ | 4 | 3 | $\underline{\underline{12}}$ | 2 | 1 | $\underline{10}$ |
| 8 | $\underline{9}$ | 1 | 2 | $\underline{\underline{16}}$ | 3 | 4 | $\underline{\underline{12}}$ | 2 | 1 | $\underline{8}$ |
| 9 | $\underline{7}$ | 1 | 2 | $\underline{9}$ | 4 | 3 | $\underline{\underline{16}}$ | 2 | 1 | $\underline{\underline{12}}$ |
| 10 | $\underline{\underline{13}}$ | 1 | 2 | $\underline{\underline{16}}$ | 3 | 4 | $\underline{9}$ | 2 | 1 | $\underline{7}$ |
| 11 | $\underline{8}$ | 1 | 2 | $\underline{\underline{13}}$ | 4 | 3 | $\underline{\underline{16}}$ | 2 | 1 | $\underline{9}$ |
| 12 | $\underline{10}$ | 1 | 2 | $\underline{\underline{13}}$ | 3 | 4 | $\underline{\underline{16}}$ | 2 | 1 | $\underline{8}$ |
| 13 | $\underline{7}$ | 1 | 2 | $\underline{\underline{13}}$ | 4 | 3 | $\underline{\underline{16}}$ | 2 | 1 | $\underline{10}$ |
| 14 | $\underline{11}$ | 1 | 2 | $\underline{\underline{13}}$ | 3 | 4 | $\underline{\underline{16}}$ | 2 | 1 | $\underline{7}$ |
| 15 | $\underline{5}$ | 1 | 2 | $\underline{\underline{13}}$ | 4 | 3 | $\underline{\underline{16}}$ | 2 | 1 | $\underline{11}$ |
| 16 | $\underline{10}$ | 1 | 2 | $\underline{\underline{13}}$ | 3 | 4 | $\underline{\underline{16}}$ | 2 | 1 | $\underline{5}$ |
| 17 | $\underline{6}$ | 1 | 2 | $\underline{\underline{13}}$ | 4 | 3 | $\underline{\underline{16}}$ | 2 | 1 | $\underline{10}$ |
| 18 | $\underline{9}$ | 1 | 2 | $\underline{\underline{13}}$ | 3 | 4 | $\underline{\underline{16}}$ | 2 | 1 | $\underline{6}$ |
| 19 | $\underline{5}$ | 1 | 2 | $\underline{9}$ | 4 | 3 | $\underline{\underline{13}}$ | 2 | 1 | $\underline{\underline{16}}$ |
| 20 | $\underline{\underline{17}}$ | 1 | 2 | $\underline{\underline{13}}$ | 3 | 4 | $\underline{9}$ | 2 | 1 | $\underline{5}$ |
| 21 | $\underline{6}$ | 1 | 2 | $\underline{\underline{17}}$ | 4 | 3 | $\underline{\underline{13}}$ | 2 | 1 | $\underline{9}$ |
| 22 | $\underline{10}$ | 1 | 2 | $\underline{\underline{17}}$ | 3 | 4 | $\underline{\underline{13}}$ | 2 | 1 | $\underline{6}$ |
| 23 | $\underline{5}$ | 1 | 2 | $\underline{\underline{17}}$ | 4 | 3 | $\underline{\underline{13}}$ | 2 | 1 | $\underline{10}$ |

WINDING SEQUENCE—Continued

| Decade No. | 0 | 1 | 2 | 3 | 4 | 5 | 6 | 7 | 8 | 9 |
|---|---|---|---|---|---|---|---|---|---|---|
| 24 | 11 | 1 | 2 | 17 | 3 | 4 | 13 | 2 | 1 | 5 |
| 25 | 7 | 1 | 2 | 17 | 4 | 3 | 13 | 2 | 1 | 11 |
| 26 | 10 | 1 | 2 | 17 | 3 | 4 | 13 | 2 | 1 | 7 |
| 27 | 8 | 1 | 2 | 17 | 4 | 3 | 13 | 2 | 1 | 10 |
| 28 | 9 | 1 | 2 | 17 | 3 | 4 | 13 | 2 | 1 | 8 |
| 29 | 7 | 1 | 2 | 9 | 4 | 3 | 17 | 2 | 1 | 13 |
| 30 | 12 | 1 | 2 | 17 | 3 | 4 | 9 | 2 | 1 | 7 |
| 31 | 8 | 1 | 2 | 12 | 4 | 3 | 17 | 2 | 1 | 9 |
| 32 | 10 | 1 | 2 | 12 | 3 | 4 | 17 | 2 | 1 | 8 |
| 33 | 7 | 1 | 2 | 12 | 4 | 3 | 17 | 2 | 1 | 10 |
| 34 | 11 | 1 | 2 | 12 | 3 | 4 | 17 | 2 | 1 | 7 |
| 35 | 5 | 1 | 2 | 12 | 4 | 3 | 17 | 2 | 1 | 11 |
| 36 | 10 | 1 | 2 | 12 | 3 | 4 | 17 | 2 | 1 | 5 |
| 37 | 6 | 1 | 2 | 12 | 4 | 3 | 17 | 2 | 1 | 10 |
| 38 | 9 | 1 | 2 | 12 | 3 | 4 | 17 | 2 | 1 | 6 |
| 39 | 5 | 1 | 2 | 9 | 4 | 3 | 12 | 2 | 1 | 17 |
| 40 | 18 | 1 | 2 | 12 | 3 | 4 | 9 | 2 | 1 | 5 |
| 41 | 6 | 1 | 2 | 18 | 4 | 3 | 12 | 2 | 1 | 9 |
| 42 | 10 | 1 | 2 | 18 | 3 | 4 | 12 | 2 | 1 | 6 |
| 43 | 5 | 1 | 2 | 18 | 4 | 3 | 12 | 2 | 1 | 10 |
| 44 | 11 | 1 | 2 | 18 | 3 | 4 | 12 | 2 | 1 | 5 |
| 45 | 7 | 1 | 2 | 18 | 4 | 3 | 12 | 2 | 1 | 11 |
| 46 | 10 | 1 | 2 | 18 | 3 | 4 | 12 | 2 | 1 | 7 |
| 47 | 8 | 1 | 2 | 18 | 4 | 3 | 12 | 2 | 1 | 10 |
| 48 | 9 | 1 | 2 | 18 | 3 | 4 | 12 | 2 | 1 | 8 |
| 49 | 7 | 1 | 2 | 9 | 4 | 3 | 18 | 2 | 1 | 12 |
| 50 | 14 | 1 | 2 | 18 | 3 | 4 | 9 | 2 | 1 | 7 |
| 51 | 8 | 1 | 2 | 14 | 4 | 3 | 18 | 2 | 1 | 9 |
| 52 | 10 | 1 | 2 | 14 | 3 | 4 | 18 | 2 | 1 | 8 |
| 53 | 7 | 1 | 2 | 14 | 4 | 3 | 18 | 2 | 1 | 10 |
| 54 | 11 | 1 | 2 | 14 | 3 | 4 | 18 | 2 | 1 | 7 |
| 55 | 5 | 1 | 2 | 14 | 4 | 3 | 18 | 2 | 1 | 11 |
| 56 | 10 | 1 | 2 | 14 | 3 | 4 | 18 | 2 | 1 | 5 |
| 57 | 6 | 1 | 2 | 14 | 4 | 3 | 18 | 2 | 1 | 10 |
| 58 | 9 | 1 | 2 | 14 | 3 | 4 | 18 | 2 | 1 | 6 |
| 59 | 5 | 1 | 2 | 9 | 4 | 3 | 14 | 2 | 1 | 18 |
| 60 | 17 | 1 | 2 | 14 | 3 | 4 | 9 | 2 | 1 | 5 |
| 61 | 6 | 1 | 2 | 17 | 4 | 3 | 14 | 2 | 1 | 9 |
| 62 | 10 | 1 | 2 | 17 | 3 | 4 | 14 | 2 | 1 | 6 |
| 63 | 5 | 1 | 2 | 17 | 4 | 3 | 14 | 2 | 1 | 10 |
| 64 | 11 | 1 | 2 | 17 | 3 | 4 | 14 | 2 | 1 | 5 |
| 65 | 7 | 1 | 2 | 17 | 4 | 3 | 14 | 2 | 1 | 11 |
| 66 | 10 | 1 | 2 | 17 | 3 | 4 | 14 | 2 | 1 | 7 |
| 67 | 8 | 1 | 2 | 17 | 4 | 3 | 14 | 2 | 1 | 10 |
| 68 | 9 | 1 | 2 | 17 | 3 | 4 | 14 | 2 | 1 | 8 |
| 69 | 7 | 1 | 2 | 9 | 4 | 3 | 17 | 2 | 1 | 14 |
| 70 | 15 | 1 | 2 | 17 | 3 | 4 | 9 | 2 | 1 | 7 |
| 71 | 8 | 1 | 2 | 15 | 4 | 3 | 17 | 2 | 1 | 9 |
| 72 | 10 | 1 | 2 | 15 | 3 | 4 | 17 | 2 | 1 | 8 |
| 73 | 7 | 1 | 2 | 15 | 4 | 3 | 17 | 2 | 1 | 10 |
| 74 | 11 | 1 | 2 | 15 | 3 | 4 | 17 | 2 | 1 | 7 |
| 75 | 5 | 1 | 2 | 15 | 4 | 3 | 17 | 2 | 1 | 11 |
| 76 | 10 | 1 | 2 | 15 | 3 | 4 | 17 | 2 | 1 | 5 |

WINDING SEQUENCE—Continued

| Decade No. | 0 | 1 | 2 | 3 | 4 | 5 | 6 | 7 | 8 | 9 |
|---|---|---|---|---|---|---|---|---|---|---|
| 77 | 6 | 1 | 2 | 15 | 4 | 3 | 17 | 2 | 1 | 10 |
| 78 | 9 | 1 | 2 | 15 | 3 | 4 | 17 | 2 | 1 | 6 |
| 79 | 5 | 1 | 2 | 9 | 4 | 3 | 15 | 2 | 1 | 17 |
| 80 | 16 | 1 | 2 | 15 | 3 | 4 | 9 | 2 | 1 | 5 |
| 81 | 6 | 1 | 2 | 16 | 4 | 3 | 15 | 2 | 1 | 9 |
| 82 | 10 | 1 | 2 | 16 | 3 | 4 | 15 | 2 | 1 | 6 |
| 83 | 5 | 1 | 2 | 16 | 4 | 3 | 15 | 2 | 1 | 10 |
| 84 | 11 | 1 | 2 | 16 | 3 | 4 | 15 | 2 | 1 | 5 |
| 85 | 7 | 1 | 2 | 16 | 4 | 3 | 15 | 2 | 1 | 11 |
| 86 | 10 | 1 | 2 | 16 | 3 | 4 | 15 | 2 | 1 | 7 |
| 87 | 8 | 1 | 2 | 16 | 4 | 3 | 15 | 2 | 1 | 10 |
| 88 | 9 | 1 | 2 | 16 | 3 | 4 | 15 | 2 | 1 | 8 |
| 89 | 7 | 1 | 2 | 9 | 4 | 3 | 16 | 2 | 1 | 15 |
| 90 | 14 | 1 | 2 | 16 | 3 | 4 | 9 | 2 | 1 | 7 |
| 91 | 8 | 1 | 2 | 14 | 4 | 3 | 16 | 2 | 1 | 9 |
| 92 | 10 | 1 | 2 | 14 | 3 | 4 | 16 | 2 | 1 | 8 |
| 93 | 7 | 1 | 2 | 14 | 4 | 3 | 16 | 2 | 1 | 10 |
| 94 | 11 | 1 | 2 | 14 | 3 | 4 | 16 | 2 | 1 | 7 |
| 95 | 5 | 1 | 2 | 14 | 4 | 3 | 16 | 2 | 1 | 11 |
| 96 | 10 | 1 | 2 | 14 | 3 | 4 | 16 | 2 | 1 | 5 |
| 97 | 6 | 1 | 2 | 14 | 4 | 3 | 16 | 2 | 1 | 10 |
| 98 | 9 | 1 | 2 | 14 | 3 | 4 | 16 | 2 | 1 | 6 |
| 99 | 5 | 1 | 2 | 9 | 4 | 3 | 16 | 2 | 1 | 14 |

Referring now to FIGS. 1 and 2 of the drawings, it is seen that wiper arm 20, secured to shaft 21 engages contact leads 1 to 18 upon rotation of the shaft. The wiper connects to ground and thus the leads 1 to 18 are successively grounded as the wiper passes over the lead turns on the mandrel 22.

The memory devices comprise three groups of four bistable devices, i.e., units flip-flops 23, 24, 25, 26 tens flip-flops 27, 28, 29, 31 and hundreds flip-flops 32, 33, 34, 35, all of which are of similar construction. As seen in FIG. 3, each flip-flop comprises a pair of transistors 36, 37 having their emitters interconnected and the collectors and bases cross connected through resistors 38, 39. A D.C. supply of for example 25 volts is connected to the transistor emitters through resistor 41. In this circuit, a given lead is assumed to represent the binary state "1" if its voltage with respect to ground is near that of the positive supply and the state "0" if near ground potential. The flip-flop output is taken at the collector of transistor 37 and connects to an associated relay. Thus when transistor 37 is off, the relay is de-energized and when on the relay is energized. The cross connections of the transistors insure that when one transistor is on, the other is off. The ground pulse from a lead to the base of a transistor will cause it to conduct and the associated transistor will extinguish. For example, when the wiper grounds lead 1, the transistor 36 will conduct to raise the potential of its collector which is passed through resistor 38 to the base of transistor 37 causing it to assume an off condition and de-energize the associated relay. The diode 42 is provided to absorb any inductive surge when the relay goes off.

Each bistable unit 23–35 connects to a double pole double throw relay 43, 44, 45, 46, 47, 48, 49, 51, 52, 53, 54 and 55 respectively which serve to convert the Gray companion code to the weighted binary decimal code. Each relay has a pair of "*a*" contacts and a pair of "*b*" contacts as seen in FIG. 1. The center *a* contact of each relay connects to a lamp such as 56 connected to relay contact 43*a*. The other side of each lamp is grounded. The conversion circuit will be understood by tracing through an example. Consider now the shaft in the position corresponding to decimal numeral 21. Reference to the Gray companion code set forth in Table 1 shows that this is binary number 0000 0011 0001. Thus the flip-flops 23, 27, 28 are in a state to energize their associated relays 43, 47 and 48 respectively so that the *a* and *b* contacts of these relays are in the down position as viewed in FIG. 1. A circuit can now be traced from D.C. source 69, upper contacts 55*b*, 54*b*, 53*b*, 52*b*, wire 71, 51*b*, 49*b*, lower contact of 48*a*, through lamp 62 to ground. The circuit also continues from center contact 48*a*, wire 72, lower contact of 47*b*, wire 73, contacts 46*b*, 45*b*, 44*b* to wire 74. However contacts 43*a* are in the down position and thus lamp 56 connects to wire 74 through these contacts. Thus with Gray number 0000, 0011, 0001 represented by the condition of the flip-flops, lamps 62 and 56 are energized indicating binary number 0000, 0010, 0001 which from Table 1 is the weighted code companion for decimal numeral 21. It is seen then that the relay circuit effects the desired conversion based upon the rule any Gray companion code digit appears at the output in either true or complementary form depending on whether there are an even or odd number of 1's in the more significant digits of the Gray code. Relays offer the advantage of simplicity and output circuit isolation which was desirable for the experimental model, but have the draw-backs usually ascribed to mechanical switching devices of slow speed and restricted life.

The use of the lamps to indicate the output is only one of a number of possible ways that the converted output may be read. Another arrangement is to provide an analog voltage proportional to the number represented by the code. Thus there are provided three groups of four resistors $R_1$ generally indicated by numerals 75, 76 and 77. Each group corresponds to a decimal digit and each resistor connects to its associated relay output and to wire 70. The code chosen as hereinabove explained is the weighted 2421 code. Thus the four resistors in each group have conductances in this proportion and in this order. In the hundreds digit, for example, the resistors have the resistance proportionality of $2R_1$, $R_1$, $2R_1$ and $4R_1$ and thus their conductances are in the proportion 2421. The voltage divider so constructed creates a voltage division of the supply voltage 69 equal to the decimal number represented divided by 999. The source impedance of this divider is constant and equal to $400/999R_1$ so with a lead resistor 79 equal to $400R_1$, the output voltage then becomes equal to the supply voltage multiplied by $N/1000$ where N is the number represented.

Another method of indicating the output is to provide ammeters 78, 80 and 81 for the units, tens and hundreds digits respectively. Three groups of resistors 82, 83 and 84 connect the conversion relays to the meters and each group of resistors have their conductances proportional to 2421, the weights of the binary digits of the chosen code. Thus a current is established through each meter proportional to the sum of weights of the digit represented.

In the embodiment of the invention described above, mechanical relays were disclosed for converting the Gray companion code to the weighted code but it is of course understood that electronic relays could be equally well used.

Since the eighteen leads out of the encoder are pulses only one at a time, a modified version contemplates encoding the output itself so as to require fewer than eighteen circuits. Five binary circuits is the minimum that could be used to encode eighteen different states. However, the coding scheme must be such that when two leads are energized during a transition from one to the other, there must be no ambiguity relative to interpretation of the code.

This situation is similar to that which initially gave rise to minimum switching codes, and it seems relevant it inquire whether a minimum switching arrangement could not be worked out for the multiplex mode of operation. A study of the encoder switching sequence reveals that at one time or another leads 1–4 become adjacent to leads 12–18. In addition, lead 1 is adjacent leads 5–11 and lead 2 and 4 adjacent lead 9. Thus, for instance, lead 1 is at one point or another adjacent to fourteen different leads, and it would be impossible to have a 5-digit code word for lead 1 which is minimum switching with respect to more than five other code words.

A method which gives the desired result is based on the idea of having every code word for a change command (encoder output lead) contain exactly the same number of 1's, The decoding circuit will then not recognize any code word not having the correct number of 1's present, and the spurious command that might otherwise be generated when two code words occur simultaneously is avoided.

For five binary digits, the best that can be done according to this concept gives only ten possible combinations using either two or three 1's out of five. However, with six binary digits, there are twenty possibilities for three out of six 1's which is adequate for eighteen commands and requires only one more digit than the minimum. Eighteen possibilities for three out of six 1's with the digits identified as *p* thru *u* as follows:

TABLE 3

| No. | u t s r q p | No. | u t s r q p |
|---|---|---|---|
| 1 | 0 0 0 1 1 1 | 10 | 1 1 0 0 0 1 |
| 2 | 0 0 1 0 1 1 | 11 | 0 0 1 1 1 0 |
| 3 | 0 1 0 0 1 1 | 12 | 0 1 0 1 1 0 |
| 4 | 1 0 0 0 1 1 | 13 | 1 0 0 1 1 0 |
| 5 | 0 0 1 1 0 1 | 14 | 0 1 1 0 1 0 |
| 6 | 0 1 0 1 0 1 | 15 | 1 0 1 0 1 0 |
| 7 | 1 0 0 1 0 1 | 16 | 1 1 0 0 1 0 |
| 8 | 0 1 1 0 0 1 | 17 | 0 1 1 1 0 0 |
| 9 | 1 0 1 0 0 1 | 18 | 1 0 1 1 0 0 |

The above eighteen code words would be appropriately assigned to the change commands and a code disc such as 90 in FIG. 4 provided. The disc would have six wipers 91 for the six tracks on the code disc. The conducting tracks on the disc would connect to ground and would be laid out in accordance with the change commands assigned to the code words of Table 3. There are a number of choices for this assignment and mechanical convenience in laying out the conductive segments would dictate the appropriate choice. The six leads 92 through 97 from the wipers 91 connect to a decoding circuit shown in part in FIG. 5. This circuit would take the form of six STROKE gates 98 employed simply as inverters and eighteen others such as 99 having six inputs. (Alternately, the circuit could employ NOR gates by appropriate rearrangement.) FIG. 7 shows the circuit for decoding word number 5 of Table 3, i.e., 001101. It is seen that leads 92, 93 and 96 having the 0 condition connect directly to gate 99 whereas leads 94, 95 and 97, having the 1 condition, are passed through inverting gates 98 to gate 99. Thus with all inputs to gate 99 having the 0 condition, an output will be produced which will be applied to lead 5 of FIG. 1 resulting in the command $\overline{a1}$, $\overline{d1}$ of Table 2.

Seventeen additional gates 99 are provided, with appropriate connections to leads 92 through 97 and 92*a* through 97*a*, corresponding to the other leads of FIG. 1.

Although the present invention has been described with respect to specific embodiments thereof, it is understood that these are merely examples of the basic invention and various modifications could be made within the spirit and scope of the present invention as defined in the appended claims.

I claim:

1. A device of the character described comprising means to receive an analog input signal, a plurality of binary signal transmission channels, means synchronized with the analog input to selectively apply binary pulses to the transmission channels, a plurality of digital storage means connected to said transmission channels and adapted to assume predetermined stable conditions in accordance with received pulses, said storage means being connected to the transmission channels whereby a received pulse effects a change command and a verifying command to determine the conditions of the digital storage means.

2. An analog-to-digital converter comprising means to receive an analog signal, a plurality of binary signal transmission channels, means synchronized with the analog input to selectively apply binary pulses to the transmission channels, a plurality of bistable elements adapted to assume predetermined combinations of conditions representative of the analog input signal, said plurality of bistable elements being connected to the transmission channels whereby a received binary pulse effects a change in the combination of conditions thereof and selectively effects a correction change in the combination of conditions.

3. Apparatus as defined in claim 1 including means wherein the predetermined combination of conditions of the plurality of bistable elements is established during a relatively small variation of the analog input signal.

4. An analog-to-digital converter comprising means to receive an analog input a plurality of binary signal transmission channels, means to apply binary code signals to the said transmission channels in a predetermined sequence in accordance with variations of the analog input, digital storage means operably related to the transmission channels and adapted to assume predetermined conditions in accordance with the analog input, each of said code signals providing a change command and a redundant command, said digital storage means being responsive to each change command and selectively responsive to the redundant command to effect a verification of the predetermined condition of the digital storage means.

5. A converter of the type described comprising mechanical analog input means, energizable means arranged in a predetermined sequence and adapted to be energized in accordance with the movement of said mechanical analog input means, scanning means operably associated with said energizable means to successively provide binary command signals therein, storage means connected to said scanning means adapted to selectively assume predetermined conditions in accordance with the position of said analog input, means whereby the command signals effect predetermined changes in the storage means, and means whereby the command signals are operable to correct the condition of said storage means during a small positional change of said mechanical analog input means.

6. Apparatus as defined in claim 5 including conversion means controlled by the storage means to convert the output thereof to a weighted binary decimal code.

7. Apparatus as defined in claim 6 including means connected to the conversion means to indicate the position of the mechanical analog input means in weighted binary coded decimal form.

8. Apparatus as defined in claim 7 wherein the indicating means comprises a plurality of lamp means corresponding to each decimal digit.

9. Apparatus as defined in claim 8 wherein the indicating means comprises meter means corresponding to each decimal digit.

10. Apparatus responsive to the angular position of a rotatable shaft comprising position transmitting means including a circular series of stationary electroconductive contact means positioned in a predetermined sequence, a single rotatable wiper secured to the shaft and adapted to successively engage said stationary contact means as the shaft rotates to provide binary signals at said contact means in accordance with the angular position of the shaft, position indicating means comprising a plurality of groups of bistable elements, each group corresponding to a decimal digit of shaft position indication, electroconductive means connecting said series of stationary contact means and said groups of bistable elements whereby each binary signal changes the condition of selected bistable elements and a plurality of said binary signals are operable to determine the condition of said plurality of groups of bistable elements.

11. An analog-to-digital converter comprising a plurality of electroconductor means arranged in a predetermined sequence; wiper means synchronized with a mechanical input to the encoder and adapted to engage said electroconductor means to sequentially apply electrical pulses thereto; a first group of units digit bistable elements; a second group of tens digit bistable elements; a third group of hundreds digit bistable elements; said plurality of electroconductor means being connected to said first, second and third groups of bistable elements to control the condition thereof in response to the pulses applied by the wipper means; each electroconductor means being connected to a plurality of bistable elements to simultaneously control the conditions thereof upon receipt of a pulse; and means whereby a pulse to any tens or hundreds digit bistable element is also applied to a plurality of units digit bistable elements whereby the total combination of conditions of the bistable elements corresponds to predetermined positions of the mechanical input after a small movement thereof regardless of the prior conditions of said elements.

12. A device of the character described comprising means to receive an analog input signal, a plurality of digital storage devices adapted to store code values, said digital storage devices being responsive to predetermined first command signals, means to encode said first command signals, a plurality of transmission channels adapted to receive said encoded command signals, decoder means connected to said transmission channels to provide said predetermined first command signals, means to apply said first command signals to the digital storage device and means whereby said first command signals effect a change in the digital storage means and are operable to correct the condition of the digital storage means during a small change in the analog input signal.

13. A device of the character described comprising means to receive an analog input signal, digital storage means adapted to assume a plurality of predetermined conditions in accordance with the analog input signal, means whereby command signals representative of said analog input signal are operable to selectively determine the condition of the digital storage means, means to encode said command signals whereby each encoded signal contains the same number of similar binary conditions, a plurality of transmission channels in operable relation with said digital storage means, means to apply said encoded signals to the transmission channels, means to decode said encoded signals to provide command signals for the storage means whereby the condition of the storage means is determined in accordance with the analog input.

14. A device of the character described comprising means to receive an analog input signal, digital storage means adapted to assume a plurality of predetermined conditions in accordance with the analog input signal, said storage means being responsive to predetermined binary signals, means whereby said binary signals provide a first command to change the condition of the storage means and a second command to determine the predetermined condition of the storage means, means to encode said binary signals, a plurality of transmission channels in operative relation to the encoder means to receive encoded binary signals, decoder means connected to said transmission channels to decode the encoded binary signals and means to apply said binary signals to the storage means.

References Cited by the Examiner

UNITED STATES PATENTS 2,782,408 2/57 Fisher et al. __________ 340—347
2,882,524 4/59 Spencer __________ 235—154 XR
2,963,697 12/60 Giel _________________ 340—347

MALCOLM A. MORRISON, *Primary Examiner.*